United States Patent
Cohen (10) Patent No.: US 8,317,111 B2
(45) Date of Patent: Nov. 27, 2012

(54) BI-COMPONENT DRIP EMITTER

(75) Inventor: Amir Cohen, Yuvalim (IL)

(73) Assignee: Amirim Products Development & Patents Ltd., Yuvalim (IL)

( * ) Notice: Subject to any disclaimer, the term of this patent is extended or adjusted under 35 U.S.C. 154(b) by 336 days.

(21) Appl. No.: 12/697,255

(22) Filed: Jan. 31, 2010

(65) Prior Publication Data

US 2011/0186652 A1    Aug. 4, 2011

(51) Int. Cl.
*B05B 15/00* (2006.01)
(52) U.S. Cl. .......................... 239/542; 239/547
(58) Field of Classification Search .................. 239/542, 239/107, 547, 533.1, 108, 109, DIG. 19
See application file for complete search history.

(56) References Cited

U.S. PATENT DOCUMENTS

| | | | |
|---|---|---|---|
| 4,059,228 A | 11/1977 | Werner | |
| 4,209,133 A | 6/1980 | Mehoudar | |
| 4,331,293 A | 5/1982 | Rangel-Garza | |
| 4,623,094 A | 11/1986 | Smeyers | |
| 4,682,730 A | 7/1987 | Smeyers | |
| 5,183,208 A | 2/1993 | Cohen | |
| 5,203,503 A | 4/1993 | Cohen | |
| 5,279,462 A | 1/1994 | Mehoudar | |
| 5,400,973 A | 3/1995 | Cohen | |
| 5,615,838 A | 4/1997 | Eckstein et al. | |
| 5,636,797 A | 6/1997 | Cohen | |
| 5,813,603 A * | 9/1998 | Kurtz | 239/1 |
| 5,829,685 A | 11/1998 | Cohen | |
| 6,027,048 A | 2/2000 | Mehoudar | |
| 6,250,571 B1 | 6/2001 | Cohen | |
| 6,886,761 B2 | 5/2005 | Cohen | |
| 2003/0057301 A1 | 3/2003 | Cohen | |
| 2011/0186652 A1 | 8/2011 | Cohen | |
| 2012/0199673 A1 | 8/2012 | Cohen | |

FOREIGN PATENT DOCUMENTS

| | | |
|---|---|---|
| BE | 895982 | 8/1983 |
| EP | 1884157 | 2/2008 |
| IL | WO2006030419 | 3/2006 |
| IL | WO2008/035335 | 3/2008 |
| IL | WO2008035332 | 3/2008 |

OTHER PUBLICATIONS

International Search Report and the Written Opinion Dated Jun. 27, 2011 From the International Searching Authority Re. Application No. PCT/IB2010/055930.
International Preliminary Report on Patentability Dated Aug. 9, 2012, From the International Bureau of WIPO Re. Application No. PCT/IB2010/055930.

\* cited by examiner

*Primary Examiner* — Davis Hwu

(57) ABSTRACT

A drip emitter formed from an elastomer component and a rigid polymer component for welding to the inner surface of an irrigation hose. The drip emitter has a fluid flow pathway including a flow restriction, typically in the form of a labyrinth, formed at least partially within the elastomer to provide a variable geometry flow restriction. The flow restriction may include under-tooth bypass spaces located between the base and the sequence of baffles, over-tooth bypass clearances or may employ baffles with a thickened root portion which forms a sloped transition region between an upright upper wall portion and the base. In each case, flow through the drip emitter when deployed is regulated by pressure-responsive deformation of the elastomer component. Some implementations employ a thermoset elastomer component such as silicone with mechanical interlocking between the components.

34 Claims, 9 Drawing Sheets

BI-COMPONENT DRIP EMITTER

FIELD AND BACKGROUND OF THE INVENTION

The present invention relates to drip emitters for use with drip irrigation hose and, in particular, it concerns a bi-component drip emitter for attachment to an inner surface of a wall of an irrigation hose.

Drip emitters for use in irrigation hoses include a flow restriction to reduce flow rates to the desired level. Examples of flow restrictions include, but are not limited to, laminar flow restrictions, and patterns of meandering fine flow passageways referred to as labyrinths.

In some cases, elastomer materials are employed as part of a flow restriction designed to provide a variable flow restriction geometry. The variable geometry is designed to be responsive to the fluid pressure within the supply hose so as to at least partially compensate for flow rate variations due to changes in the pressure within the hose. An example of such an arrangement is my U.S. Pat. No. 5,400,973 in which a flat elastomer diaphragm is deformed by pressure within the hose to sequentially close clearances across the top of a sequence of baffles forming a labyrinth.

The above approach is highly advantageous, providing pressure compensated regulation of the drip outlet flow rate. However, the use of a separate elastomer diaphragm dictates a two-part, or more often three-part, design, requiring an assembly step during production and thus increasing production costs.

As an alternative approach, an elastomer may be employed as a bulk material for production of a single piece drip emitter with pressure compensation. Examples of such devices may be found in my U.S. Pat. No. 6,886,761, which employs an elastomer labyrinth with varying height baffles such that pressure increase in the hose sequentially closes a bypass channel formed between the baffles and the wall of the hose. A further example is my published Patent Application No. WO 2008/035335 in which an elastomer labyrinth is formed from baffles with an upright upper wall portion and a thickened root portion which forms a sloped transition region between the upper wall portion and the base. In this case, when the fluid pressure within the irrigation hose increases, the sloped transition region becomes progressively flattened to define an increased turbulence flow path geometry, thereby regulating the flow rate through the drip emitter.

In both of these cases, the elastomer component is formed by an extrusion process, or co-extrusion. The resulting structures have many advantages, but require a relatively large proportion of elastomer material, and are limited to the use of certain types of elastomer which provide sufficient structural support and which can be effectively bonded to the inner surface of an irrigation hose. Furthermore, production by extrusion techniques inherently limits the range of shapes that can be produced, and provides relatively low manufacturing precision.

Finally, reference is made to my U.S. Pat. No. 5,203,503 which discloses a bi-component drip emitter produced by a bi-component injection molding technique. The bi-component injection molding technique perform two-stage injection with relative movement of the mold parts between stages, resulting in a unitary structure in which an elastomer component defining a fine laminar flow restriction is implanted within a rigid polymer device. This requires a small quantity of elastomeric material to provide a variable geometry flow restriction while the rest of the drip emitter structure is formed from rigid polymer material, thereby reducing production costs and providing a structure well suited for bonding to the inner surface of an irrigation hose.

While promising significant advantages as mentioned, practical implementation of a bi-component drip emitter by bi-component molding presents various challenges. Specifically, the device disclosed in my U.S. Pat. No. 5,203,503 typically fails to achieve reliable flow rate compensation due to the high sensitivity of the laminar flow restriction to variations in geometry (requiring ten times more precision than the turbulent variable geometry labyrinth options described below). Performance of the variable flow restriction is also typically very sensitive to variations in positioning of the drip emitter relative to the inner surface of the hose wall due to variations in the welding attachment process.

Finally, thermoset elastomers such as silicone have various potential advantages over other elastomer materials for production of compensated drip emitters, for example, exhibiting high resistance to creep. However, bi-component molding techniques are challenging to implement for devices which combine thermoset and thermoplastic components, and are particularly problematic for production of drip emitters due to the failure of silicone to bond firmly with adjacent rigid polymer material.

There is therefore a need for a bi-component drip emitter which would provide improved flow compensation, which would render the device less sensitive to variations in position of the drip emitter relative to the inner surface of the hose wall, and/or which would provide effective retention of a component folioed from silicone.

SUMMARY OF THE INVENTION

The present invention is a bi-component drip emitter for attachment to an inner surface of a wall of an irrigation hose.

According to the teachings of an embodiment of the present invention there is provided, an apparatus comprising a drip emitter for attachment to an inner surface of a wall of an irrigation hose, the drip emitter comprising an elastomer component, wherein the drip emitter is configured such that, when attached to the inner surface of the irrigation hose, the drip emitter defines: (a) a water inlet for receiving water from the irrigation hose; (b) a drip outlet for releasing water through an opening in the wall of the irrigation hose; and (c) a fluid flow pathway from the water inlet to the drip outlet, the fluid flow pathway including a labyrinth flow restriction, at least part of the labyrinth flow restriction being formed in the elastomer component, the at least part of the labyrinth flow restriction comprising: (i) a sequence of baffles, (ii) a base underlying the sequence of baffles, and (iii) a plurality of under-tooth bypass spaces located between the base and the sequence of baffles, wherein the base is exposed to the fluid pressure within the irrigation hose such that increased fluid pressure within the irrigation hose causes progressive closing of the under-tooth bypass spaces, thereby regulating the flow rate through the drip emitter.

According to a further feature of an embodiment of the present invention, the drip emitter further comprises a rigid polymer component.

There is also provided according to a further aspect of an embodiment of the present invention, an apparatus comprising a drip emitter for attachment to an inner surface of a wall of an irrigation hose around less than half of the periphery of the irrigation hose, the drip emitter comprising: (a) an elastomer component; and (b) a rigid polymer component extending around the elastomer component on at least three sides, wherein the drip emitter is configured such that, when welded to the inner surface of the irrigation hose, the drip emitter defines: (i) a water inlet for receiving water from the irrigation hose; (ii) a drip outlet for releasing water through an opening in the wall of the irrigation hose; and (iii) a fluid flow pathway from the water inlet to the drip outlet, the fluid flow pathway including a labyrinth flow restriction, at least part of the labyrinth flow restriction being a variable geometry labyrinth formed in the elastomer component, the variable geometry labyrinth comprising: (A) a sequence of baffles, (B) a base underlying the sequence of baffles, and (C) a plurality of over-tooth bypass clearances formed along the top edges of the sequence of baffles such that, when welded to the inner surface of the irrigation hose, the bypass clearances allow a flow of water between the sequence of baffles and the inner surface of the wall of the hose, wherein the base is exposed to the fluid pressure within the irrigation hose such that increased fluid pressure within the irrigation hose causes progressive closing of the bypass channel, thereby regulating the flow rate through the drip emitter.

There is also provided, according to a further aspect of an embodiment of the present invention, an apparatus comprising a drip emitter for attachment to an inner surface of a wall of an irrigation hose around less than half of the periphery of the irrigation hose, the drip emitter comprising: (a) an elastomer component; and (b) a rigid polymer component extending around the elastomer component on at least three sides, wherein the drip emitter is configured such that, when welded to the inner surface of the irrigation hose, the drip emitter defines: (i) a water inlet for receiving water from the irrigation hose; (ii) a drip outlet for releasing water through an opening in the wall of the irrigation hose; and (iii) a fluid flow pathway from the water inlet to the drip outlet, the fluid flow pathway including a labyrinth flow restriction, at least part of the labyrinth flow restriction being a variable geometry labyrinth formed in the elastomer component, the variable geometry labyrinth comprising: (A) a sequence of baffles, and (B) a base underlying the sequence of baffles, wherein an underside of the base is exposed to the fluid pressure within the irrigation hose, and wherein the baffles of the variable geometry labyrinth have an upright upper wall portion and a thickened root portion which forms a sloped transition region between the upper wall portion and the base such that, when the fluid pressure within the irrigation hose increases, the sloped transition region becomes progressively flattened to define an increased turbulence flow path geometry, thereby regulating the flow rate through the drip emitter.

According to a further feature of an embodiment of the present invention, the rigid polymer component extends around the elastomer component on at least three sides.

According to a further feature of an embodiment of the present invention, the drip emitter presents a hose interface including contact surfaces for interacting with the inner surface of the wall of the hose, the hose interface including: (a) a frame formed by the rigid polymer component extending around the elastomer component on at least three sides; and (b) margins provided by the elastomer component for abutting the inner surface of the wall of the hose so as to delimit the variable flow restriction.

According to a further feature of an embodiment of the present invention, the frame projects beyond the margins such that, when the frame is welded to the inner surface of the wall of the hose, the frame penetrates into the wall of the hose to a greater degree than the margins.

According to a further feature of an embodiment of the present invention, the elastomer component and rigid component are integrally formed together.

According to a further feature of an embodiment of the present invention, the elastomer component and rigid component are formed by bi-component injection molding.

According to a further feature of an embodiment of the present invention, the elastomer component and the rigid polymer component are formed with complementary interlocking features formed so as to mechanically retain the elastomer component engaged with the rigid polymer component.

There is also provided, according to a further aspect of an embodiment of the present invention, an irrigation system comprising: (a) an irrigation hose; and (b) a plurality of drip emitters as defined above attached to an inner surface of the irrigation hose at intervals along a length of the irrigation hose.

There is also provided, according to a further aspect of an embodiment of the present invention, an apparatus comprising a drip emitter for attachment to an inner surface of a wall of an irrigation hose around less than half of the periphery of the irrigation hose, the drip emitter comprising: (a) a thermoset elastomer component; and (b) a rigid polymer component extending around the elastomer component on at least three sides, wherein the drip emitter is configured such that, when welded to the inner surface of the irrigation hose, the drip emitter defines: (i) a water inlet for receiving water from the irrigation hose; (ii) a drip outlet for releasing water through an opening in the wall of the irrigation hose; and (iii) a fluid flow pathway from the water inlet to the drip outlet, the fluid flow pathway including a flow restriction, at least part of the flow restriction being a variable geometry flow restriction formed by the thermoset elastomer component, and wherein a region of the thermoset elastomer component is exposed to a fluid pressure within the irrigation hose and configured such that variation of fluid pressure within the irrigation hose affects the variable geometry flow restriction so as to regulate a flow rate through the drip emitter, and wherein the thermoset elastomer component and the rigid polymer component are formed with complementary interlocking features formed such that, when the rigid polymer component is welded to the inner surface of the irrigation hose, the thermoset elastomer component is mechanically retained in engagement with the rigid polymer component.

According to a further feature of an embodiment of the present invention, the complementary interlocking features are configured such that the thermoset elastomer component is mechanically retained against disengagement from the rigid polymer component in any direction.

According to a further feature of an embodiment of the present invention, the thermoset elastomer component includes a sealing margin deployed to seal against the inner surface of the irrigation hose and defining the drip outlet.

According to a further feature of an embodiment of the present invention, the drip emitter presents a hose interface including contact surfaces for interacting with the inner surface of the wall of the hose, the hose interface including: (a) a frame formed by the rigid polymer component extending around the elastomer component on at least three sides; and (b) margins provided by the elastomer component for abutting the inner surface of the wall of the hose so as to delimit the variable flow restriction.

According to a further feature of an embodiment of the present invention, the frame projects beyond the margins such that, when the frame is welded to the inner surface of the wall of the hose, the frame penetrates into the wall of the hose to a greater degree than the margins.

According to a further feature of an embodiment of the present invention, the flow restriction is implemented as a labyrinth.

According to a further feature of an embodiment of the present invention, at least part of the labyrinth comprises a sequence of baffles and a base, the sequence of baffles and the base being integrally formed as part of the thermoset elastomer component.

According to a further feature of an embodiment of the present invention, the elastomer component and rigid component are formed by bi-component injection molding.

BRIEF DESCRIPTION OF THE DRAWINGS

The invention is herein described, by way of example only, with reference to the accompanying drawings, wherein:

FIG. 48 is an enlarged view of the region of FIG. 3C marked by circle "AF";

DESCRIPTION OF THE PREFERRED EMBODIMENTS

The present invention is a bi-component drip emitter.

The principles and operation of bi-component drip emitters according to the present invention may be better understood with reference to the drawings and the accompanying description.

By way of introduction, various aspects of the present invention will be illustrated herein with reference to four non-limiting embodiments described below. Specifically, FIGS. 1A-5D illustrate a first embodiment of the present invention in which a bi-component drip emitter includes an elastomer labyrinth with variable geometry under-tooth bypass spaces. FIGS. 6A-7C illustrate a second embodiment of the present invention in which a bi-component drip emitter includes an elastomer labyrinth with a variable geometry including over-tooth bypass clearances. FIGS. 8A-8D illustrate a third embodiment of the present invention in which a bi-component drip emitter includes an elastomer labyrinth employing baffles with a thickened root portion which forms a sloped transition region between an upright upper wall portion and the base. Finally, FIGS. 9A-12B illustrate a further aspect of the present invention in which a bi-component drip emitter is implemented with a thermoset elastomer such as silicone as the elastomer component.

Before addressing the exemplary embodiments in detail, it should be understood in generic terms that embodiments of the present invention relate to a bi-component drip emitter (denoted 100, 200, 300 or 400 in the exemplary embodiments described below) of a type affixed by welding to the inner surface of the wall of a polymer irrigation hose, preferably around less than half the periphery of the irrigation hose and at spaced locations along the hose. In general terms, introducing uniform reference numerals which will be used for similar elements throughout the description and drawings, the drip emitter includes an elastomer component 10 which is molded within a rigid polymer component 12. The drip emitter is configured such that, when welded to the inner surface of an irrigation hose 60, it defines a water inlet, shown here as a set of slits 14, for receiving water from the irrigation hose, a drip outlet 16 for releasing water through a hole 62 in the wall of the irrigation hose, and a fluid flow pathway from the water inlet to the drip outlet. The fluid flow pathway includes a flow restriction, typically in the form of a labyrinth flow restriction, and typically includes a constant geometry flow restriction 18a in addition to a variable geometry flow restriction 18b. At least the latter is formed by the elastomer component 10, as will be detailed in the context of each embodiment. A region of the elastomer component 10 is exposed to a fluid pressure within the irrigation hose and configured such that variation of fluid pressure within the irrigation hose affects the variable geometry flow restriction so as to regulate a flow rate through the drip emitter.

According to an aspect of the present invention, the drip emitters are produced by bi-component molding techniques. These techniques may be as described in my prior U.S. Pat. No. 5,203,503, which is hereby incorporated by reference in its entirety as if set out herein. Various implementations of this technology suitable for implementing the present invention, and corresponding injection molding devices, are commercially available from a number of sources, including ARBURG GmbH (DE) and BRAUNFORM GmbH (DE). Further details of the appropriate sequence of injection molding operations and design of the mold components will be clear to one ordinarily skilled in the art on the basis of the description of the various embodiments described below, and will not be addressed here in detail.

Definitions

Before addressing the specific exemplary embodiments of the present invention in detail, it will be useful to define certain terminology as used herein in the description and claims. Firstly, the drip emitters of the present invention are described as being of a type affixed by welding to the inner surface of the wall of a polymer irrigation hose around less than half the periphery of the irrigation hose and at spaced locations along the hose. The phrase "spaced locations along the hose" is used herein to denote a self-contained drip emitter for localized attachment to the drip irrigation hose, in contrast to continuous strip type drip emitters which are formed by extrusion techniques. The term "irrigation hose" is used herein generically to refer to any and all types of irrigation hose, whether seamless or formed with a welded seam, and independent of the structural material, the wall thickness or the degree of flexibility of the hose.

The phrase "around less than half periphery of the irrigation hose" is used herein to denote a drip emitter which is attached to one side of the inner periphery of the irrigation hose, in contrast to cylindrical inserts. It should be noted however that many aspects of the present invention are applicable also to cylindrical inserts.

The term "welding" is used to refer to the bonding technique used to attach the drip emitter to the wall of the irrigation hose, and typically refers to the bond generated when the drip emitter is pressed against the wall while the wall is still soft and hot as part of the extrusion production line for the irrigation hose. This bond typically results in a part of the rigid polymer component, and often also the thermoplastic elastomer, of the drip emitter being slightly embedded into the hose wall and forming a strong bond with the hose material, as will be discussed further below. It should be noted, however, that the term "welding" is used here in a broad sense, and does not exclude the possibility of additional physical or chemical conditions or processes being performed to enhance the boding of the parts.

Reference will be made to features of the drip emitter which define an inlet, an outlet and a flow path therebetween. It will be noted that the drip emitter is used, as stated above, attached to an inner surface of an irrigation hose, and that the surface of the irrigation hose wall typically serves as a closing surface that provides a functional part of the various flow-path-defining features of the drip emitter. Nevertheless, the various flow-path features of the drip emitter may be considered fully defined by the structure of the drip emitter alone, taking into consideration that the spatial relation to the closing surface of the irrigation hose is also defined by features of the emitter itself, without requiring any particular structure or features in the irrigation hose.

The inlet is therefore defined by one or more opening which, after bonding of the drip emitter to the inner surface of an irrigation hose, defines a flow path from the interior of the hose into the drip emitter. Most preferably, a plurality of slits or other small openings are used, thereby providing a filtering function, as will be discussed below.

The outlet is configured to allow release of water drops through a hole in the wall of the irrigation hose. In the examples described below, the outlet is a flat recess facing the hose wall providing a piercing region within which a hole is formed through the hose wall. Alternative outlet configurations, such as a projecting outlet conduit projecting through the hose wall, also fall within the scope of the invention.

The term "labyrinth" is used to refer to any flow restriction which is implemented as a long thin flow path, and most typically, as a meandering or zigzag flow pattern. The barriers between sections or legs of the path are referred to as "baffles" or "teeth", and may be of any shape. In a preferred case, the baffles are deployed as "interlocking baffles", i.e., projecting inwards alternately from opposing sides of a channel in an interlocking pattern, thereby defining a to-and-fro labyrinth flow path.

Reference is made to a variable geometry flow path which serves to "regulate" the drip emitter flow, and to provide a "compensated" drip emitter. In this context, the terms "regulate" and "compensate" are used to refer to pressure responsive properties which at least partially compensate for variations in flow rate which would otherwise result from variations in the pressure within the irrigation hose.

Reference is made in some embodiments to "bypass spaces" or "bypass clearances" which are spaces or clearances which allow some or all of the flow through a labyrinth to bypass one or more baffles. These spaces and clearances are arranged to progressively close and open as a function of the pressure within the irrigation hose, thereby modifying the properties of the flow restriction. The spaces and clearances are typically defined in an unstressed state of the elastomer component of the drip emitter and vary in dimensions in response to increased pressure within the irrigation hose.

The bi-component drip emitters according to an aspect of the present invention employ an "elastomer" component. The term "elastomer" is used herein in the description and claims to refer to any elastomeric material with sufficient flexibility to provide variable geometry flow regulation as taught in the context of the various embodiments below, and for which the elastic behavior is roughly repeatable. Preferred examples of suitable elastomers include, but are not limited to, thermoplastic elastomers (TPE) such as SANTOPRENE® and thermosetting polymers such as silicone.

The term "rigid polymer" is used herein to refer to any structural polymer suitable for forming the bulk structure of the drip emitter of the present invention, and which is less flexible than the elastomer used. Preferred but non-limiting examples of a suitable rigid polymer include polyethylene (PE) and polypropylene (PP).

The various exemplary embodiments and various aspects of the present invention illustrated therein will now be addressed with reference to the drawings.

Under-Tooth Bypass Spaces

Referring now to the drawings, FIGS. 1A-5D show a drip emitter, generally designated 100, constructed and operative according to a first embodiment of the present invention. Drip emitter 100 is of a type for attachment to an inner surface of a wall of an irrigation hose around less than half of the periphery of the irrigation hose at spaced apart locations along the irrigation hose, as will be illustrated specifically with reference to FIGS. 5A-5D.

As described in general terms above, drip emitter 100 includes an elastomer component 10 and a rigid polymer component 12, and is configured such that, when welded to the inner surface of the irrigation hose, drip emitter 100 defines a water inlet 14 for receiving water from the irrigation hose, a drip outlet 16 for releasing water through the wall of the irrigation hose, and a fluid flow pathway from the water inlet to the drip outlet. In the embodiment illustrated here, the fluid flow pathway is formed with a flow restriction implemented as a labyrinth formed by a sequence of baffles 102 and a base 104. A first part of the flow path 18a is a labyrinth with a relatively fixed geometry while a second part of the flow path 18b has a variable geometry, as detailed below. At least the variable part of the flow path 18b, with its corresponding part of the sequence of baffles 102 and base 104, is integrally formed as part of the elastomer component 10.

It is a particular feature of an aspect of the present invention illustrated here that elastomer component 10 further comprises a plurality of under-tooth bypass spaces 106 passing between the base and the sequence of baffles. Drip emitter 100 is configured so that, when deployed, the underside of the base is exposed to the fluid pressure within the irrigation hose. The form of under-tooth bypass spaces 106 and base 104 are chosen such that increased fluid pressure within the irrigation hose causes progressive closing of under-tooth bypass spaces 106, thereby regulating the flow rate through drip emitter 100.

Figures 1A, 1B, 4A:
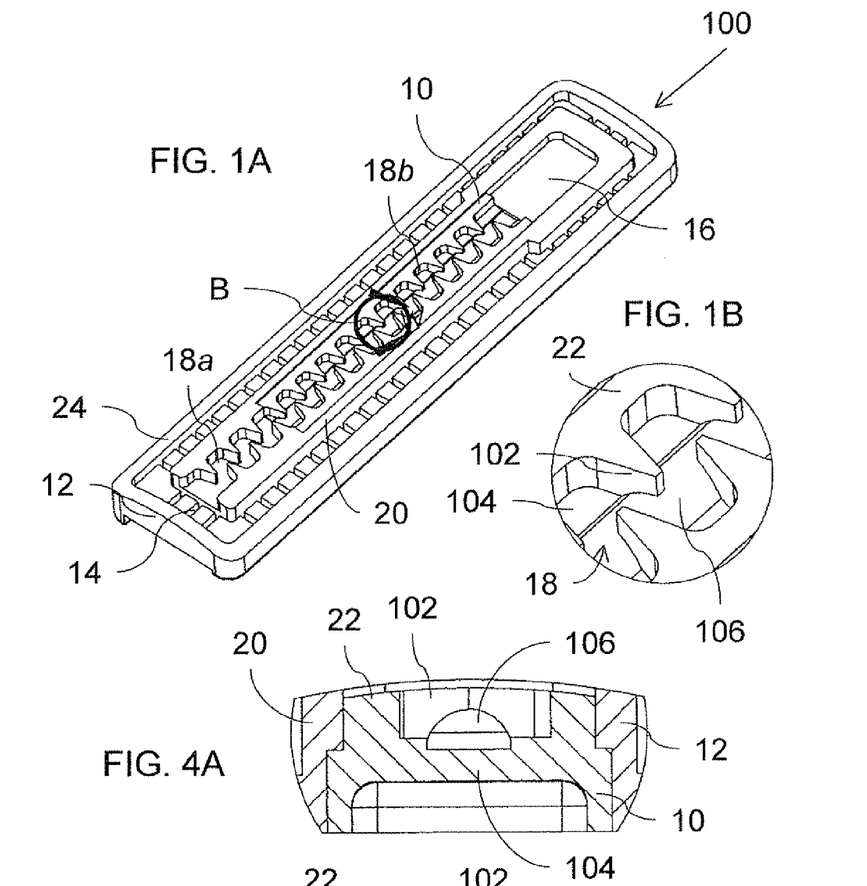
FIG. 1A is an isometric view of a first embodiment of a drip emitter, constructed and operative according to an aspect of the teachings of the present invention, for attachment to an inner surface of a wall of an irrigation hose.
FIG. 1B is an enlarged view of the region of FIG. 1A marked by circle "B"
FIG. 4A is an enlarged view of the region of FIG. 38 marked by circle "AC"
Figure 2:
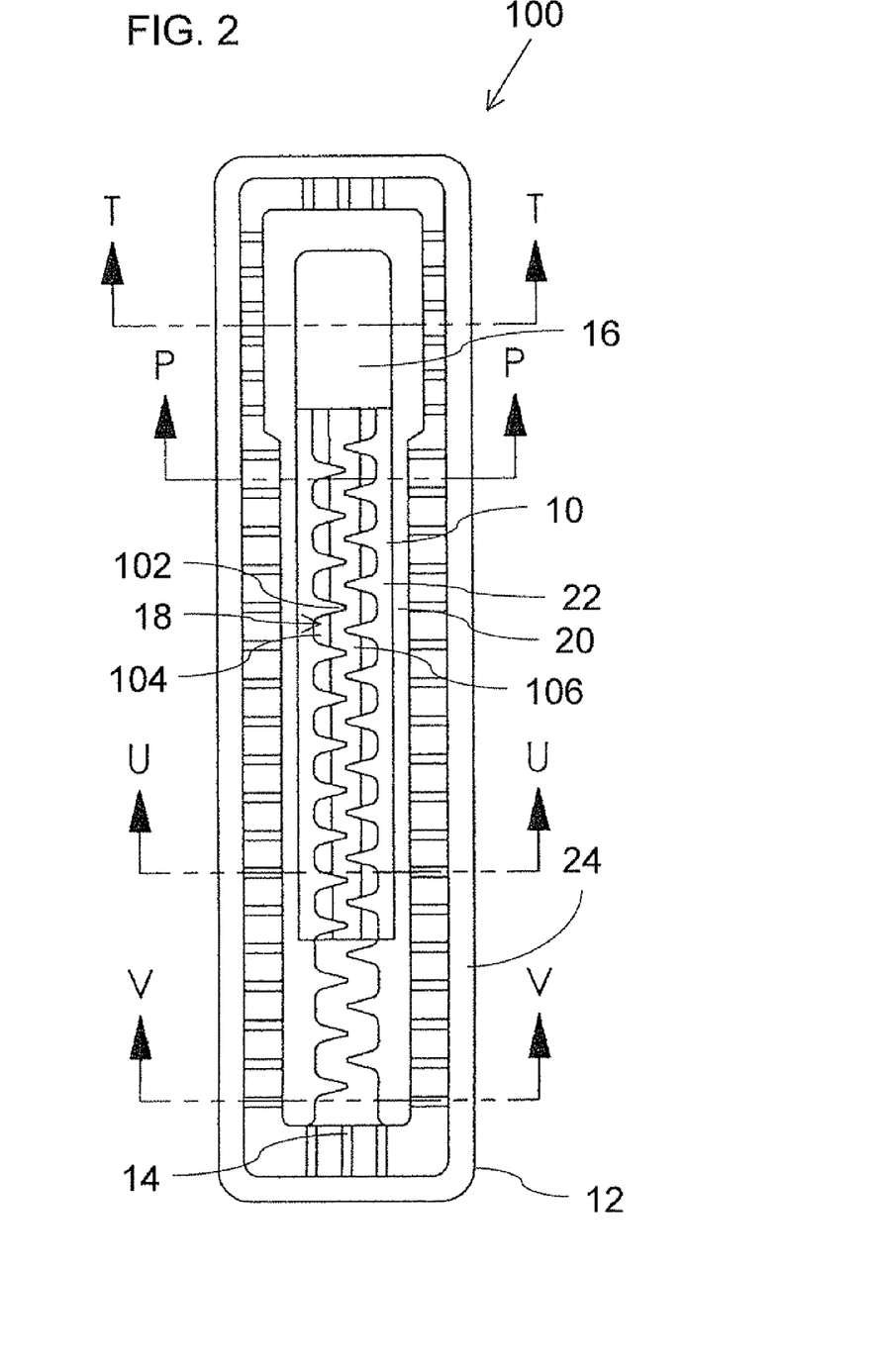
FIG. 2 is a top view of the drip emitter of FIG. 1A.
Figure 3A:
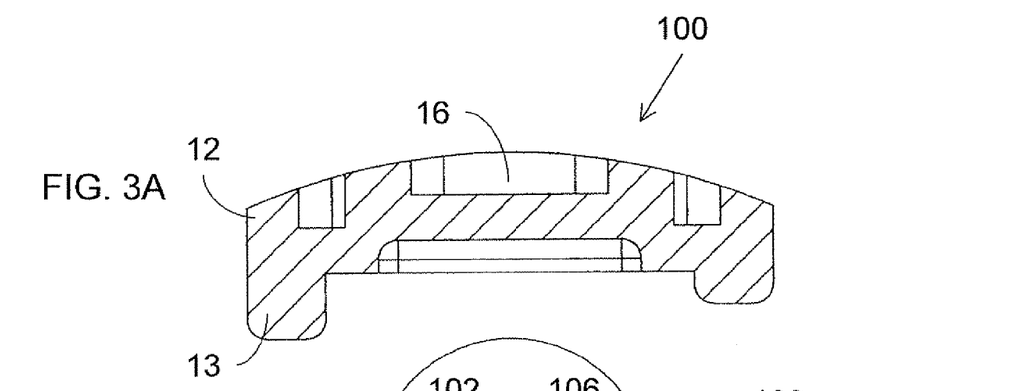
FIG. 3A is a cross-sectional view taken along the line T-T of FIG. 2.
Figure 3B:
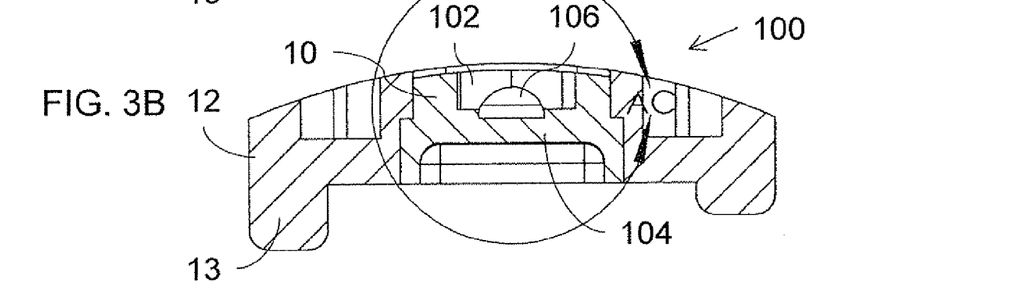
FIG. 3B is a cross-sectional view taken along the line P-P of FIG. 2.
Figure 3C:
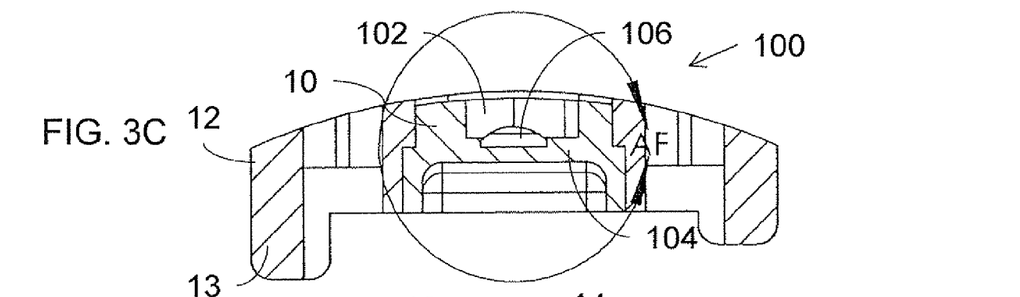
FIG. 3C is a cross-sectional view taken along the line U-U of FIG. 2.
Figure 3D:
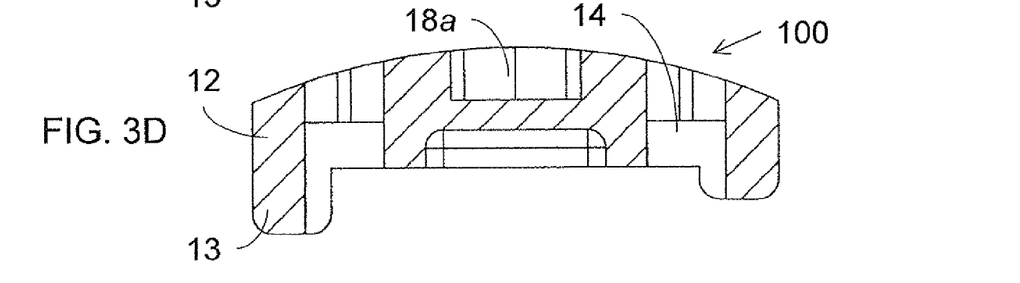
FIG. 3D is a cross-sectional view taken along the line V-V of FIG. 2.
Figure 4B:
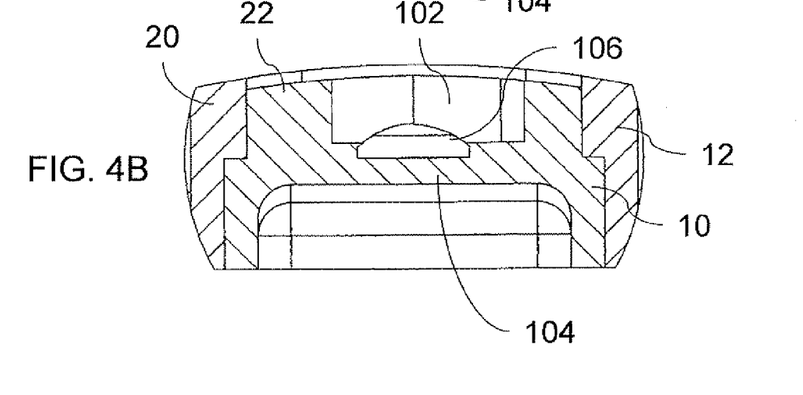

In the preferred example illustrated here, progressive closure of under-tooth bypass spaces 106 is enhanced by varying the cross-sectional size and shape of the bypass spaces along the length of the labyrinth. Thus, in the cross-sectional view of FIG. 4B, taken near the beginning of the variable geometry labyrinth, spaces 106 are relatively shallow and flat, thereby facilitating closure of the bypass spaces in this region by upward deformation of base 104 at moderate pressures. In FIG. 4A, corresponding to a cross-section taken near outlet 16, under-tooth bypass spaces 106 is deeper and has steeper sides, making it more resistant to complete closure until pressures towards the upper end of the working range of pressures are applied to the underside of base 104.

It will be noted that the graduated shape and size of under-tooth bypass spaces 106 illustrated here is only one of many possible implementations to achieve progressive closing of the bypass spaces. For example, alternative implementations (not shown) may employ a progressively changing bypass space shape without significant variation in dimensions, or varying dimensions without significant change of shape. Additionally, or alternatively, variations in the thickness or structure of base 104 may be used to provide a graduated response to applied pressure along the length of the variable geometry flow path 18b.

Under-tooth bypass spaces 106 are described as being between baffles 102 and base 104 in the sense that base 104 and baffles 102 face each other across the spaces. The spaces may be formed by borrowing from the thickness of base 104 or from the height of baffles 102, or both, and may occupy any proportion of the width of the labyrinth flow path. Most preferably, the bypass spaces are aligned to facilitate laminar flow through a sequence of the spaces, in parallel to the flow through the labyrinth.

As the number of under-tooth bypass spaces 106 that are partially or completely closed increases, a greater proportion of the fluid flow over a greater length of the flow path is forced to follow a turbulent path around baffles 102, thereby progressively increasing the impedance to flow and at least partially compensating for increased pressure within the irrigation hose to keep the outlet drip rate closer to the design drip rate than would be achieved without such regulation.

The use of under-tooth bypass spaces 106 as described herein has additional advantages in that regulation occurs between surfaces which are all provided by the elastomer component (i.e., the underside of baffles 102 and the upper surface of base 104), and which are therefore in relatively precise spatial relation defined by the injection molding production process. This results in reliable and repeatable flow regulation properties.

The use of elastomer material for baffles 102 in the region of under-tooth bypass spaces 106 also facilitates the production process for this structure, allowing the mold feature that extends under baffles 102 to define the bypass spaces to be released after molding by momentary resilient flexing of baffles 102 without causing damage to the baffles.

Turning now a further aspect of certain embodiments of the present invention, these relate to a hose interface including contact surfaces for interacting with the inner surface of the wall of the irrigation hose. Specifically, rigid polymer component 12 preferably provides a frame 20 extending around elastomer component 10 on at least three sides. Additionally, elastomer component 10 preferably provides margins 22 for abutting the inner surface of the wall of the hose so as to limit welding depth of the elastomer component while providing a seal along the edges of the variable flow restriction. In the case illustrated here, margins 22 are contiguous with baffles 102 and form a continuous strip running along two sides of frame 20.

Figure 5A:
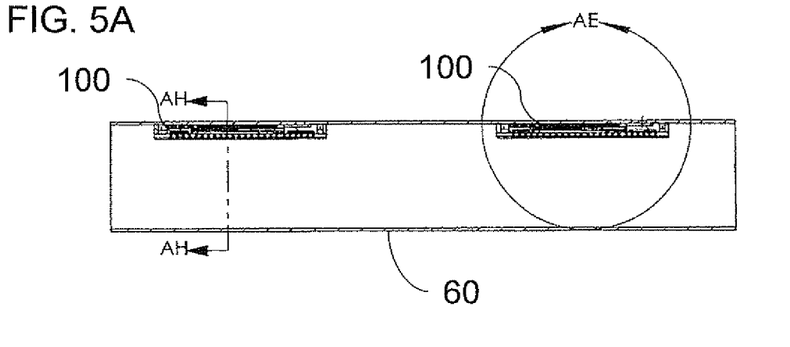
FIG. 5A is a longitudinal cross-sectional view taken through an irrigation hose employing a plurality of the drip emitters of FIG. 1A.
Figure 5B:
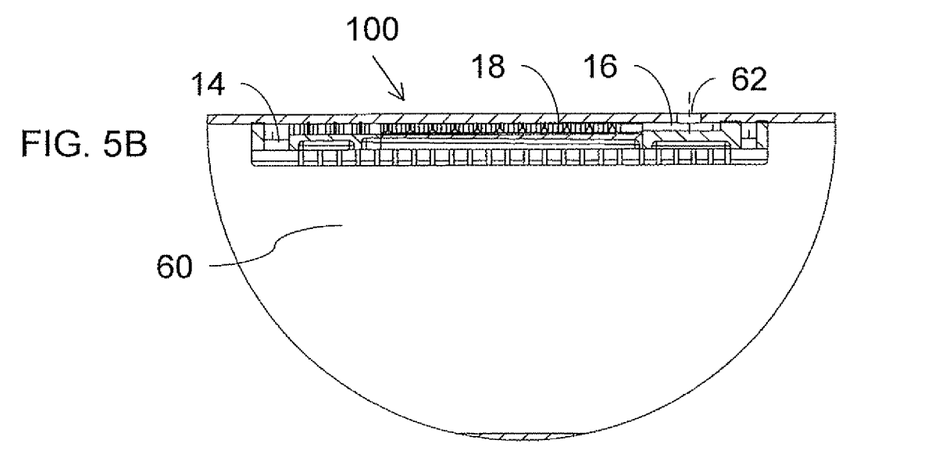
FIG. 5B is an enlarged view of the region of FIG. 5A marked by circle "AE"
Figure 5C:
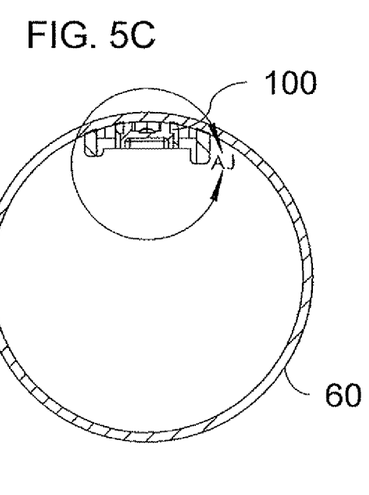
FIG. 5C is a cross-sectional view taken along the line AH-AH of FIG. 5A.

In the particularly preferred implementation illustrated here, drip emitter 100 features a double rigid frame structure, including the aforementioned frame 20 and an outer frame 24. Outer frame 24 is here a fully encompassing frame, thereby providing extensive surface contact for bonding to the irrigation hose wall and ensuring that entry of water to the drip emitter occurs only through the filtering slit structure of inlet 14. Inner frame 20 is open at one end to define the beginning of the first part of flow path 18a, has two sides between which elastomer component 10 is deployed to define the second part of flow path 18b, and terminates at a closed end which defines drip outlet 16 in the form of a recess where a hole 62 through the irrigation hose is to be formed (FIG. 5B). According to a further optional feature, rigid polymer component 12 features a downwardly projecting ridge 13 along one side (see FIGS. 3A-3D). This serves to provide easily identifiable orientation of the drip emitter for automated handling in a production line. Clearly, alternative features may be used to provide identifiable orientation, as will be clear to one ordinarily skilled in the art.

Figure 5D:
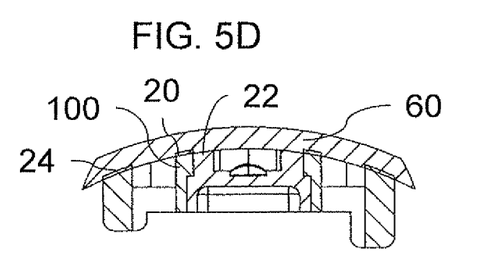
FIG. 5D is an enlarged view of the region of FIG. 5C marked by circle "AJ"

As mentioned earlier, the elastomer materials employed for elastomer component 10 typically bond less well with the wall of the irrigation hose. On the other hand, it is important to achieve sealing abutment between margins 22 of elastomer component 10 and the hose wall. For this reason, certain particularly preferred embodiments of the present invention deploy margins 22 recessed relative to frame 20 as best seen in FIGS. 4A and 4B. When frame 20 is welded to the inner surface of the wall of the hose, slight penetration occurs of the contact surfaces of frame 20 and 24 into the hose wall. Margins 22 are thus brought into contact with the surface of the wall of irrigation hose 60, as best seen in FIG. 5D, thereby ensuring sealing contact between margins 22 of the elastomer component and the wall of irrigation hose 60. Depending on the type of elastomeric material used, the elastomer may also contribute to the weld with the hose, but to a slightly lesser depth. In most cases, recessing of between 0.05 mm and 0.2 mm is used, depending primarily on the dimensions of the irrigation hose and parameters of the welding process to be used during production.

To complete the description of FIGS. 1A-5D, it will be noted that the implementation illustrated here provides a large area inlet in the form of multiple slits 14 deployed between inner frame 20 and outer frame 24, thereby providing a large area filter inlet.

Over-Tooth Bypass Clearances

Referring now to FIGS. 6A-7C, these show a drip emitter, generally designated 200, constructed and operative according to a second embodiment of the present invention. Generally speaking, drip emitter 200 is similar to drip emitter 100 described above, with equivalent elements being similarly labeled. Drip emitter 200 differs from drip emitter 100 primarily in that the under-tooth bypass spaces are here replaced by an over-tooth bypass clearances.

Thus, in the embodiment illustrated here, fluid flow pathway 18a, 18b is formed with a flow restriction implemented as a labyrinth formed by a sequence of baffles 202 and a base 204. At least part of the sequence of baffles 202 and base 204 corresponding to the variable geometry flow path 18b is integrally formed as part of the elastomer component 10.

Figures 6A, 6B, 6C, 6D, 6E:
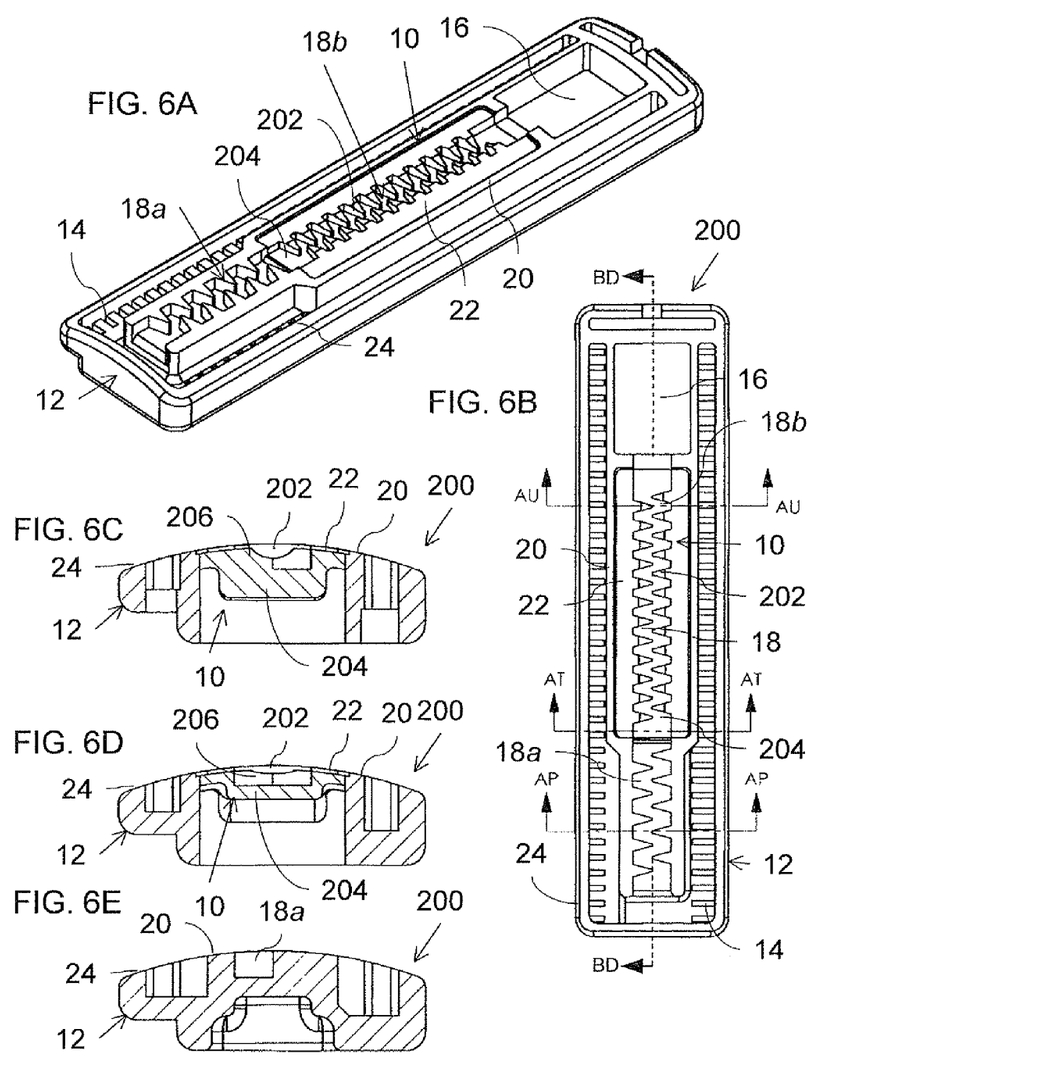
FIG. 6A is an isometric view of a second embodiment of a drip emitter, constructed and operative according to an aspect of the teachings of the present invention, for attachment to an inner surface of a wall of an irrigation hose.
FIG. 6B is a top view of the drip emitter of FIG. 6A.
FIG. 6C is a cross-sectional view taken along the line AU-AU of FIG. 6B.
FIG. 6D is a cross-sectional view taken along the line AT-AT of FIG. 6B.
FIG. 6E is a cross-sectional view taken along the line AP-AP of FIG. 6B.
Figures 6F, 7A:
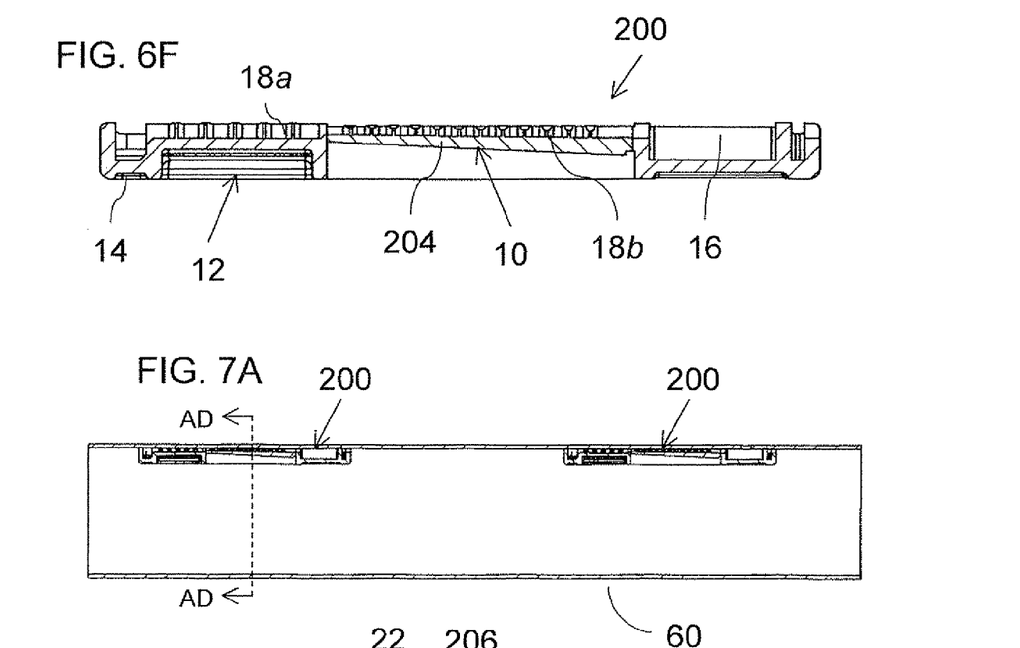
FIG. 6F is a cross-sectional view taken along the line BD-BD of FIG. 6B.
FIG. 7A is a longitudinal cross-sectional view taken through an irrigation hose employing a plurality of the drip emitters of FIG. 6A.
Figure 7B:
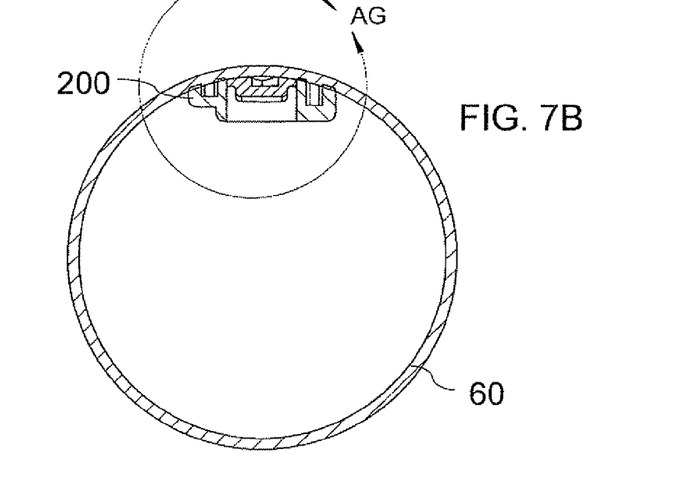
FIG. 7B is a cross-sectional view taken along the line AD-AD of FIG. 7A.
Figure 7C:
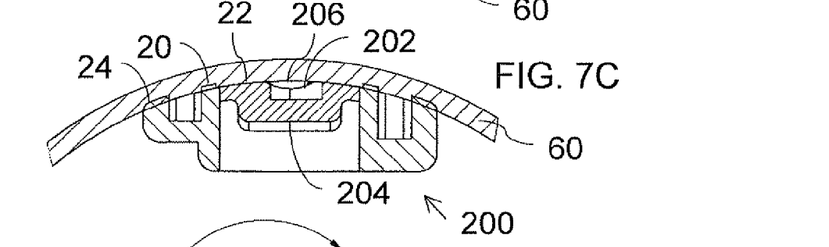
FIG. 7C is an enlarged view of the region of FIG. 7B marked by circle "AG"

Elastomer component 10 here also includes a series of bypass clearances 206 formed along the top edges of the sequence of baffles 202 such that, when welded to the inner surface of the irrigation hose as shown in FIGS. 7A-7C, bypass clearances 206 define bypass spaces between the sequence of baffles 202 and the inner surface of the wall of irrigation hose 60. At least part of base 204 is exposed to the fluid pressure within irrigation hose 60 such that increased fluid pressure within the irrigation hose causes progressive closing of bypass clearances 206, thereby regulating the flow rate through the drip emitter.

Here too, as best seen in FIGS. 6C and 6D, elastomer component 10 preferably has margins 22 recessed relative to frame 20, to achieve sealing abutment with the internal surface of irrigation hose 60 when assembled (see FIG. 7C), as described above.

Progressive closing of bypass clearances 206 against the internal surface of irrigation hose 60 may be ensured by varying the size and shape of the clearances, as well as the thickness and/or shape of base 204. In the case illustrated here, base 204 is implemented with a gradually increasing thickness along the flow path (see FIG. 6F) while the depth of bypass clearances 206 increases (compare cross-sectional views of FIGS. 6C and 6D).

This embodiment also differs somewhat from the previous embodiment in that the shape is configured to provide a wider filter inlet on either side of the fixed geometry labyrinth portion, and the structure of the support for outlet 16 differs. In other respects, the structure and operation of drip emitter 200 is analogous to that of drip emitter 100 described above, and will be understood by reference to the above description.

Variable Turbulence Labyrinth Geometry

Referring now to FIGS. 8A-8E, these show a drip emitter, generally designated 300, constructed and operative according to a third embodiment of the present invention. Generally speaking, drip emitter 300 is similar to drip emitter 100 described above, with similar elements being similarly labeled. Drip emitter 300 differs from drip emitter 100 primarily in that it employs a labyrinth flow restriction with a variable cross-section flow geometry instead of the aforementioned under-tooth bypass spaces. This embodiment also illustrates an implementation in which both the fixed geometry labyrinth part of the flow path 18a and the variable geometry flow path 18b are integrally formed as part of the elastomer component 10.

Thus, in the embodiment illustrated here, fluid flow pathway 18a, 18b is formed with a flow restriction implemented as a labyrinth formed by a sequence of baffles 302 and a base 304. At least part of the sequence of baffles 302 and base 304, and in this case the entirety of the sequence, corresponding to the fixed geometry flow path 18a and the variable geometry flow path 18b, is integrally fowled as part of the elastomer component 10. Sequence of baffles 302 and base 304 are shaped such that turbulence of the fluid flow through the labyrinth increases when the fluid pressure within the irrigation hose increases, thereby regulating the flow rate through the drip emitter.

Figures 8A, 8B, 8C, 8D, 8E:
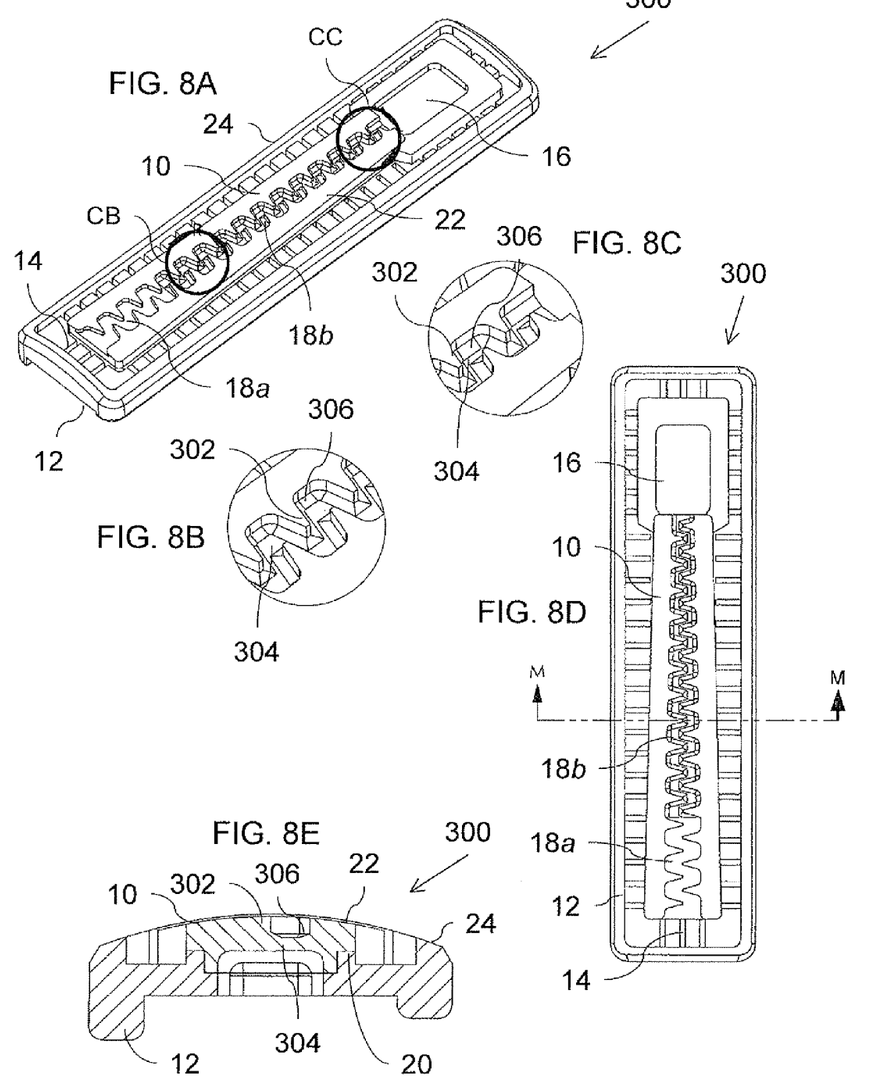
FIG. 8A is an isometric view of a third embodiment of a drip emitter, constructed and operative according to an aspect of the teachings of the present invention, for attachment to an inner surface of a wall of an irrigation hose.
FIG. 8B is an enlarged view of the region of FIG. 8A marked by circle "CB"
FIG. 8C is an enlarged view of the region of FIG. 8A marked by circle "CC"
FIG. 8D is a top view of the drip emitter of FIG. 8A.
FIG. 8E is a cross-sectional view taken along the line M-M of FIG. 8D.

The principle of operation of this regulation technique is discussed in detail in my aforementioned published Patent Application. No. WO 2008/035335, which is hereby incorporated in its entirety by reference as if set out herein. An example of a suitable form for generating variable turbulence is illustrated in FIGS. 8B and 8C where the junction between baffles 302 and base 304 features a transition region 306. Specifically, baffles 302 of the variable geometry flow path 18b have an upright upper wall portion, similar to the labyrinth teeth illustrated in the previous embodiments, but are modified by a thickened root portion which forms a sloped transition region 306 between the upper wall portion and base 304. The sloped transition region 306 may be a flat surface at an obtuse angle to the base, or may be a gradual curve or any other shape which smoothes the transition between the upright part of the baffle and the base, thereby facilitating laminar flow, at least in the bottom part of the labyrinth. As pressure increases on the underside of base 304, the transition region becomes shallower and the channel approaches a rectangular cross-section, thereby tending to generate increased turbulence and corresponding decrease in flow rate.

Here too, the channel is preferably shaped to provide progressive variation, typically by making transition region 306 progressively deeper and/or more steeply angled along the flow path. In the case illustrated here, increased depth and steepness of the transition region are achieved without increasing the cross-sectional area of the channel by combining the variations with a gradual narrowing of the channel. Additionally, or alternatively, a graduated effect can be achieved by providing graduated thickness of base 304 as illustrated with reference to drip emitter 200 above.

In this exemplary embodiment, inner frame 20 does not form part of the hose contact interface, instead being implemented as an underlying support for the elastomer component 10. Instead, it is the upper margins 22 of elastomer component 10 which provide the sealing contact and/or bonding with the inner surface of the irrigation hose, thereby sealing along the sides of flow path 18a, 18b.

As best seen in FIG. 8E, frame 20 and elastomer component 10 are preferably formed with interlocking features to provide additional mechanical support, in addition to the bonding of the elastomer and rigid components, thereby clamping the elastomer component 10 against the inner surface of the hose when welded to the inner surface of the hose.

In all other respects, the structure and operation of drip emitter 300 is similar to that of drip emitter 100 described above, and will be understood by reference to the above description.

Bi-Component Drip Emitters Employing Thermosetting Elastomer

The various exemplary embodiments of the present invention illustrated thus far are suitable for implementation using a range of elastomer and rigid polymer materials which achieve intimate bonding during the bi-component injection molding production process.

It has been proposed that thermosetting elastomer, such as silicone rubber (referred to herein simply as "silicone") or other thermosetting polymers such as EPDM (Ethylene Propylene Diene Monomer) rubber, would be advantageous for use as an elastomer in regulated drip emitters, since they combine a range of advantageous mechanical and chemical properties. It is known that silicone can be injected and can also be used as a component in bi-component injection molding techniques combining thermosetting and thermoplastic components (such as PE). Silicon, however, fails to bond with adjacent thermoplastic polymer components such as PE. A further aspect of the present invention relates to implementations of bi-component drip emitters employing thermosetting elastomeric materials. For the purpose of simplicity of presentation, an implementation of the invention will now be described by reference to a preferred but non-limiting example of silicone as the thermosetting elastomeric material.

By way of a non-limiting example, FIGS. 9A-12B illustrate a drip emitter, generally designated 400, constructed and operative according to a fourth embodiment of the present invention. Generally speaking, drip emitter 400 is similar to drip emitter 200 described above, but has been modified according to the teachings of the present invention to render it suitable for implementation using silicone. Thus, this embodiment includes baffles 402, base 404 and over-tooth clearances 406, which are structurally and functionally analogous to corresponding features 402, 404, and 406, respectfully, from drip emitter 200 described above.

It should be noted that silicone and other thermosetting elastomeric materials can equally be used in any other embodiment of the present invention, or any other bi-component drip emitter, by implementing modifications corresponding to those described herein, as will be clear to one ordinarily skilled in the art on the basis of this description.

The primary modification for implementation of drip emitter 400 with elastomer component 10 formed from silicone is that elastomer component 10 and rigid polymer component 12 are formed with complementary interlocking features formed so as to mechanically retain elastomer component 10 engaged with rigid polymer component 12. The mechanical engagement avoids reliance upon surface bonding, thereby providing a stable configuration even with silicone.

Figures 10A, 10B, 11:
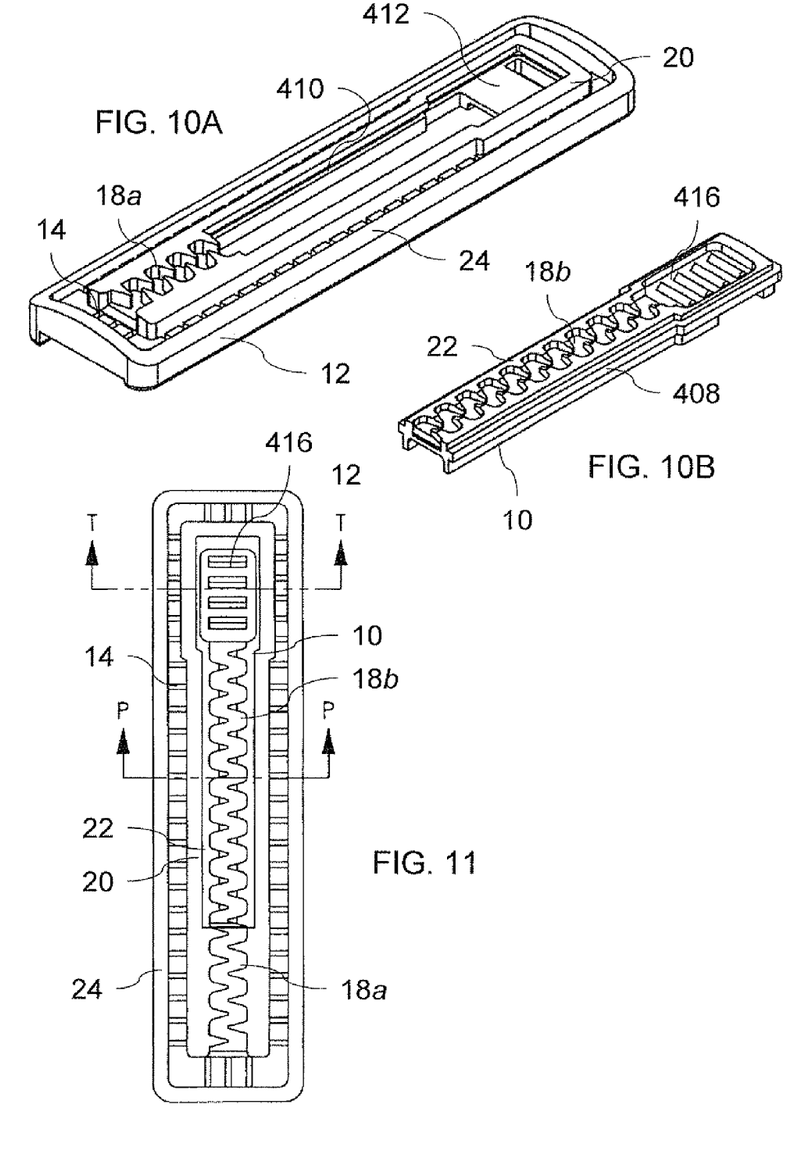
FIGS. 10A and 10B are isometric views of a rigid polymer component and a silicone component, respectively, from the drip emitter of FIG. 9A.
FIG. 11 is a top view of the drip emitter of FIG. 9A.

In the example illustrated here, the silicone elastomer component 10 is formed with a laterally projecting ridge 408 extending along its edges, and preferably around most of the periphery of the silicone elastomer component 10, as visible in FIG. 10B. The facing surfaces of rigid polymer component 12 are formed with a complementary slot 410 within which ridge 408 is engaged. Parenthetically, it should be noted that, although shown in an exploded view in FIGS. 10A and 10B, the two component are preferably formed directly in their engaged state by bi-component injection molding, and are not normally separated.

It will be noted that slot 410 is shaped to provide interlocking retention features opposing extraction of the silicone elastomer component 10 either upwards or downwards. An equivalent function could be achieved by reversing the structure, with a ridge in the rigid polymer component engaging a slot in the elastomer. Where desired, a more complex structure of interleaved elements (not shown), or embedded anchoring features (not shown), may be provided.

Figure 12B:
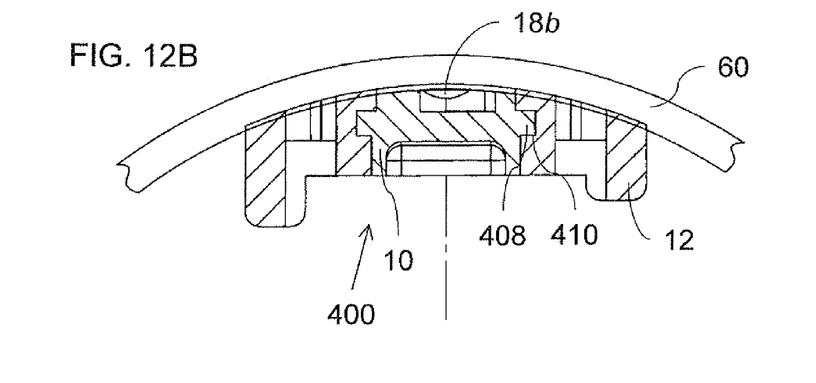
FIG. 12B is a cross-sectional view taken along the line P-P of FIG. 11, but additionally showing the drip emitter attached to part of an irrigation hose.

In addition to the mechanical engagement of the silicone component within the rigid polymer component, it will be noted that, when frames 20 and 24 are welded to the inner surface of irrigation hose 60, as illustrated in FIG. 12B, margins 22 of the silicone component are clamped against the hose surface, thereby serving to further secure the silicone component and to ensure an effective watertight seal along the edges of variable geometry flow path 18$b$.

An additional distinguishing feature of drip emitter 400 compared to drip emitter 200 is that the silicone elastomer component 10 is preferably fowled with an integrated outlet chamber recess 416. Since the silicone component does not bond to the rigid polymer component to ensure a reliable seal along the length of the labyrinth flow path and outlet region, an integrated outlet chamber recess is preferably provided to avoid possible leakage along the interface between the components which might otherwise bypass the labyrinth flow restriction.

Figures 9A, 9B, 12A:
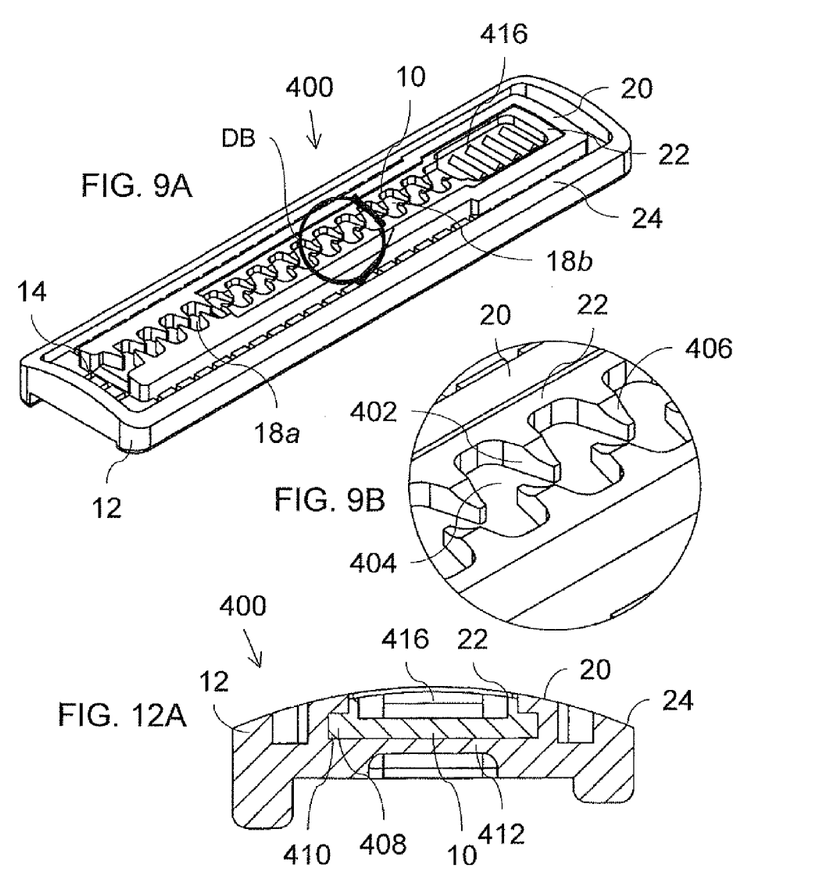
FIG. 9A is an isometric view of a fourth embodiment of a drip emitter, constructed and operative according to an aspect of the teachings of the present invention, for attachment to an inner surface of a wall of an irrigation hose.
FIG. 9B is an enlarged view of the region of FIG. 9A marked by circle "DB"
FIG. 12A is a cross-sectional view taken along the line T-T of FIG. 11.

In certain cases, it may be preferred to provide additional mechanical support for the silicone elastomer component. In the case illustrated here, rigid polymer component 12 includes an extra support shelf 412 which provides extra support for integrated outlet chamber recess 416, as best seen in FIGS. 10A and 12A.

It will be appreciated that the above descriptions are intended only to serve as examples, and that many other embodiments are possible within the scope of the present invention as defined in the appended claims.

What is claimed is:

1. Apparatus comprising a drip emitter for attachment to an inner surface of a wall of an irrigation hose, said drip emitter comprising an elastomer component, wherein said drip emitter is configured such that, when attached to the inner surface of the irrigation hose, said drip emitter defines:
    (i) a water inlet for receiving water from the irrigation hose;
    (ii) a drip outlet for releasing water through an opening in the wall of the irrigation hose; and
    (iii) a fluid flow pathway from said water inlet to said drip outlet, said fluid flow pathway including a labyrinth flow restriction, at least part of said labyrinth flow restriction being fowled in said elastomer component, said at least part of said labyrinth flow restriction comprising:
    (A) a sequence of baffles,
    (B) a base underlying said sequence of baffles, and
    (C) a plurality of under-tooth bypass spaces located between said base and said sequence of baffles;
    wherein said base is exposed to the fluid pressure within the irrigation hose such that increased fluid pressure within the irrigation hose causes progressive closing of said under-tooth bypass spaces, thereby regulating said flow rate through said drip emitter;
    wherein said drip emitter further comprises a rigid polymer component, and
    wherein said rigid polymer component extends around said elastomer component on at least three sides.

2. The apparatus of claim 1, wherein said drip emitter presents a hose interface including contact surfaces for interacting with the inner surface of the wall of the hose, said hose interface including:

(A) a frame formed by said rigid polymer component extending around said elastomer component on at least three sides; and (B) margins provided by said elastomer component for abutting the inner surface of the wall of the hose so as to delimit the variable flow restriction.

3. The apparatus of claim 2, wherein said frame projects beyond said margins such that, when said frame is welded to the inner surface of the wall of the hose, said frame penetrates into the wall of the hose to a greater degree than said margins.

4. The apparatus of claim 1, wherein said elastomer component and rigid component are integrally formed together.

5. The apparatus of claim 1, wherein said elastomer component and rigid component are foamed by hi-component injection molding.

6. The apparatus of claim 1, wherein said elastomer component and said rigid polymer component are formed with complementary interlocking features formed so as to mechanically retain said elastomer component engaged with said rigid polymer component.

7. The apparatus of claim 6, wherein said elastomer component is formed from a thermosetting elastomer.

8. An irrigation system comprising:
(a) an irrigation hose; and
(b) a plurality of drip emitters according to claim 1 attached to an inner surface of said irrigation hose at intervals along a length of said irrigation hose.

9. Apparatus comprising a drip emitter for attachment to an inner surface of a wall of an irrigation hose around less than half of the periphery of the irrigation hose, said drip emitter comprising:
(a) an elastomer component; and
(b) a rigid polymer component extending around said elastomer component on at least three sides,
wherein said drip emitter is configured such that, when welded to the inner surface of the irrigation hose, said drip emitter defines:
(i) a water inlet for receiving water from the irrigation hose;
(ii) a drip outlet for releasing water through an opening in the wall of the irrigation hose; and
(iii) a fluid flow pathway from said water inlet to said drip outlet, said fluid flow pathway including a labyrinth flow restriction, at least part of said labyrinth flow restriction being a variable geometry labyrinth formed in said elastomer component, said variable geometry labyrinth comprising:
(A) a sequence of baffles,
(B) a base underlying said sequence of baffles, and
(C) a plurality of over-tooth bypass clearances formed along the top edges of said sequence of baffles such that, when welded to the inner surface of the irrigation hose, said bypass clearances allow a flow of water between said sequence of baffles and the inner surface of the wall of the hose,
wherein said base is exposed to the fluid pressure within the irrigation hose such that increased fluid pressure within the irrigation hose causes progressive closing of said bypass channel, thereby regulating said flow rate through said drip emitter.

10. The apparatus of claim 9, wherein said drip emitter presents a hose interface including contact surfaces for interacting with the inner surface of the wall of the hose, said hose interface including:
(A) a frame formed by said rigid polymer component extending around said elastomer component on at least three sides; and
(B) margins provided by said elastomer component for abutting the inner surface of the wall of the hose so as to delimit the variable flow restriction.

11. The apparatus of claim 10, wherein said frame projects beyond said margins such that, when said frame is welded to the inner surface of the wall of the hose, said frame penetrates into the wall of the hose to a greater degree than said margins.

12. The apparatus of claim 9, wherein said elastomer component and rigid component are integrally fowled together.

13. The apparatus of claim 9, wherein said elastomer component and rigid component are formed by bi-component injection molding.

14. The apparatus of claim 9, wherein said elastomer component and said rigid polymer component are formed with complementary interlocking features formed so as to mechanically retain said elastomer component engaged with said rigid polymer component.

15. The apparatus of claim 14, wherein said elastomer component is formed from a thermosetting elastomer.

16. An irrigation system comprising:
(a) an irrigation hose; and
(b) a plurality of drip emitters according to claim 9 attached to an inner surface of said irrigation hose at intervals along a length of said irrigation hose.

17. Apparatus comprising a drip emitter for attachment to an inner surface of a wall of an irrigation hose around less than half of the periphery of the irrigation hose, said drip emitter comprising:
(a) an elastomer component; and
(b) a rigid polymer component extending around said elastomer component on at least three sides,
wherein said drip emitter is configured such that, when welded to the inner surface of the irrigation hose, said drip emitter defines:
(i) a water inlet for receiving water from the irrigation hose;
(ii) a drip outlet for releasing water through an opening in the wall of the irrigation hose; and
(iii) a fluid flow pathway from said water inlet to said drip outlet, said fluid flow pathway including a labyrinth flow restriction, at least part of said labyrinth flow restriction being a variable geometry labyrinth formed in said elastomer component, said variable geometry labyrinth comprising:
(A) a sequence of baffles, and
(B) a base underlying said sequence of baffles,
wherein an underside of said base is exposed to the fluid pressure within the irrigation hose, and wherein said baffles of said variable geometry labyrinth have an upright upper wall portion and a thickened root portion which forms a sloped transition region between said upper wall portion and said base such that, when the fluid pressure within the irrigation hose increases, said sloped transition region becomes progressively flattened to define an increased turbulence flow path geometry, thereby regulating said flow rate through said drip emitter.

18. The apparatus of claim 17, wherein said drip emitter presents a hose interface including contact surfaces for interacting with the inner surface of the wall of the hose, said hose interface including:
(A) a frame formed by said rigid polymer component extending around said elastomer component on at least three sides; and
(B) margins provided by said elastomer component for abutting the inner surface of the wall of the hose so as to delimit the variable flow restriction.

19. The apparatus of claim 18, wherein said frame projects beyond said margins such that, when said frame is welded to the inner surface of the wall of the hose, said frame penetrates into the wall of the hose to a greater degree than said margins.

20. The apparatus of claim 17, wherein said elastomer component and said rigid polymer component are formed with complementary interlocking features formed so as to mechanically retain said elastomer component engaged with said rigid polymer component.

21. The apparatus of claim 20, wherein said elastomer component is formed from a thermosetting elastomer.

22. The apparatus of claim 20, wherein said elastomer component and rigid component are integrally formed together.

23. The apparatus of claim 20, wherein said elastomer component and rigid component are formed by bi-component injection molding.

24. An irrigation system comprising:
(a) an irrigation hose; and
(b) a plurality of drip emitters according to claim 17 attached to an inner surface of said irrigation hose at intervals along a length of said irrigation hose.

25. Apparatus comprising a drip emitter for attachment to an inner surface of a wall of an irrigation hose around less than half of the periphery of the irrigation hose, said drip emitter comprising:
(a) a thermoset elastomer component; and
(b) a rigid polymer component extending around said elastomer component on at least three sides,
wherein said drip emitter is configured such that, when welded to the inner surface of the irrigation hose, said drip emitter defines:
(i) a water inlet for receiving water from the irrigation hose;
(ii) a drip outlet for releasing water through an opening in the wall of the irrigation hose; and
(iii) a fluid flow pathway from said water inlet to said drip outlet, said fluid flow pathway including a flow restriction, at least part of said flow restriction being a variable geometry flow restriction formed by said thermoset elastomer component,
and wherein a region of said thermoset elastomer component is exposed to a fluid pressure within the irrigation hose and configured such that variation of fluid pressure within the irrigation hose affects said variable geometry flow restriction so as to regulate a flow rate through said drip emitter, and wherein said thermoset elastomer component and said rigid polymer component are formed with complementary interlocking features formed such that, when said rigid polymer component is welded to the inner surface of the irrigation hose, said thermoset elastomer component is mechanically retained in engagement with said rigid polymer component,
and wherein said drip emitter presents a hose interface including contact surfaces for interacting with the inner surface of the wall of the hose, said hose interface including:
(A) a frame formed by said rigid polymer component extending around said elastomer component on at least three sides; and
(B) margins provided by said elastomer component for abutting the inner surface of the wall of the hose so as to delimit the variable flow restriction.

26. The apparatus of claim 25, wherein said complementary interlocking features are configured such that said thermoset elastomer component is mechanically retained against disengagement from said rigid polymer component in any direction.

27. The apparatus of claim 25, wherein said thermoset elastomer component includes a sealing margin deployed to seal against the inner surface of the irrigation hose and defining said drip outlet.

28. The apparatus of claim 25, wherein said frame projects beyond said margins such that, when said frame is welded to the inner surface of the wall of the hose, said frame penetrates into the wall of the hose to a greater degree than said margins.

29. The apparatus of claim 25, wherein said flow restriction is implemented as a labyrinth.

30. The apparatus of claim 29, wherein at least part of said labyrinth comprises a sequence of baffles and a base, said sequence of baffles and said base being integrally formed as part of said thermoset elastomer component.

31. The apparatus of claim 30, wherein said thermoset elastomer component further comprises a plurality of under-tooth bypass spaces passing between said base and said sequence of baffles, and wherein said base is exposed to the fluid pressure within the irrigation hose such that increased fluid pressure within the irrigation hose causes progressive closing of said under-tooth bypass spaces, thereby regulating said flow rate through said drip emitter.

32. The apparatus of claim 30, wherein said thermoset elastomer component further comprises a plurality of over-tooth bypass clearances formed along the top edges of said sequence of baffles such that, when welded to the inner surface of the irrigation hose, said bypass clearances allow a flow of water between said sequence of baffles and the inner surface of the wall of the hose, and wherein said base is exposed to the fluid pressure within the irrigation hose such that increased fluid pressure within the irrigation hose causes progressive closing of said bypass clearances, thereby regulating said flow rate through said drip emitter.

33. The apparatus of claim 30, wherein an underside of said base is exposed to the fluid pressure within the irrigation hose, and wherein said baffles of said variable geometry labyrinth have an upright upper wall portion and a thickened root portion which forms a sloped transition region between said upper wall portion and said base such that, when the fluid pressure within the irrigation hose increases, said sloped transition region becomes progressively flattened to define an increased turbulence flow path geometry, thereby regulating said flow rate through said drip emitter.

34. The apparatus of claim 25, wherein said elastomer component and rigid component are formed by bi-component injection molding.

* * * * *

UNITED STATES PATENT AND TRADEMARK OFFICE
CERTIFICATE OF CORRECTION

| | |
|---|---|
| PATENT NO. | : 8,317,111 B2 |
| APPLICATION NO. | : 12/697255 |
| DATED | : November 27, 2012 |
| INVENTOR(S) | : Amir Cohen |

It is certified that error appears in the above-identified patent and that said Letters Patent is hereby corrected as shown below:

In the Claims:

In Claim 1, Column 14 at line 49, "fowled" should be changed to --formed--.

In Claim 12, Column 16 at line 9, "fowled" should be changed to --formed--.

Signed and Sealed this
Thirteenth Day of August, 2013

Teresa Stanek Rea
*Acting Director of the United States Patent and Trademark Office*